UNITED STATES PATENT OFFICE 2,443,402

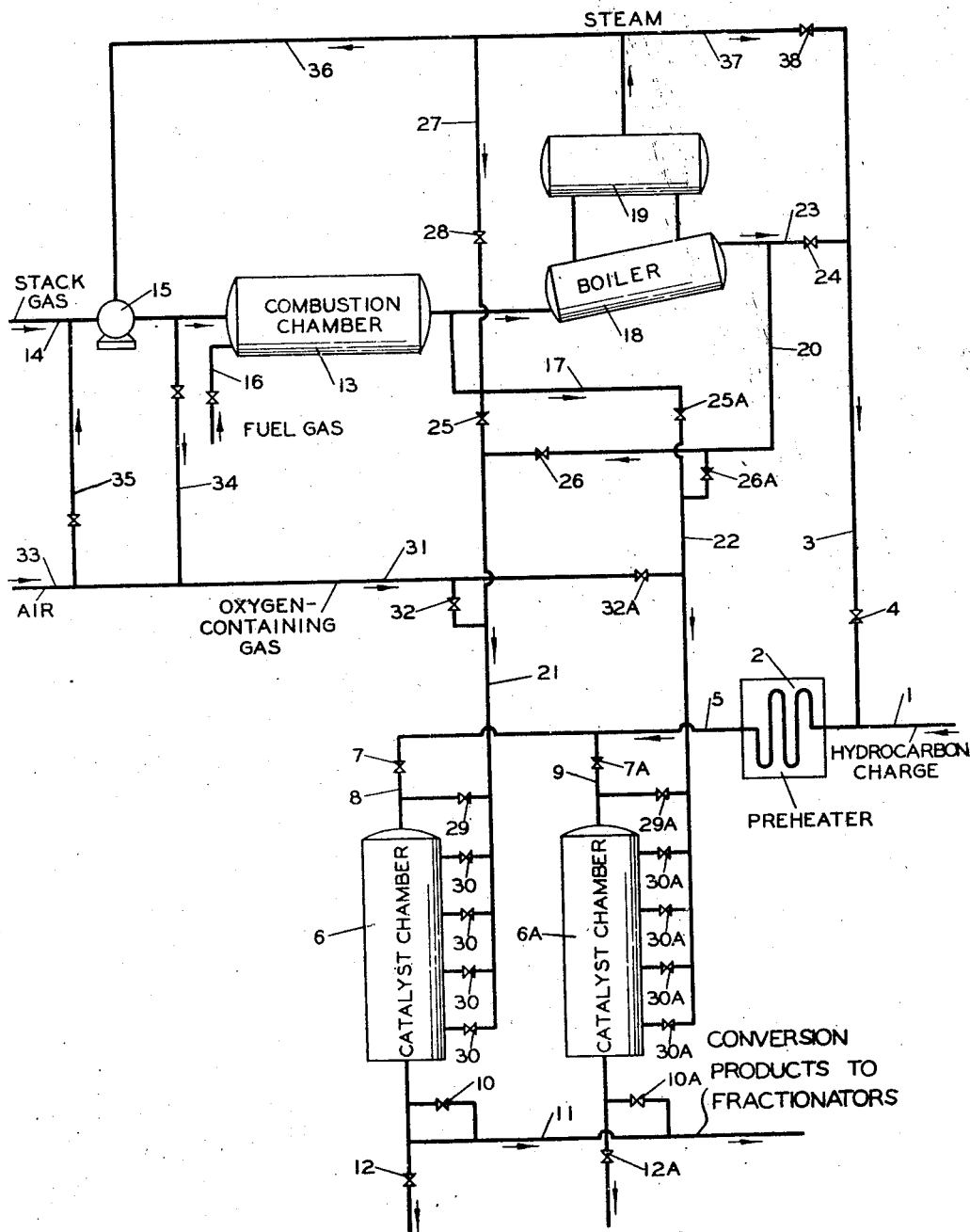

PROCESS FOR HYDROCARBON CONVERSION

Walter A. Schulze, Bartlesville, Okla., assignor to Phillips Petroleum Company, a corporation of Delaware Application February 10, 1942, Serial No. 430,278

2 Claims. (Cl. 196—52)

This invention relates to the catalytic treatment of hydrocarbons, and more particularly it relates to such catalytic endothermic reactions as cracking, dehydrogenation, reforming, and the like, which are promoted by contact catalyst masses.

One of the main problems in catalytic reactions promoted by solid contact catalysts which occur with absorption of heat is to maintain the temperature at the desired level throughout the whole catalyst mass. If the charge is preheated so that it has the desired temperature at the entrance of the catalyst bed, a serious drop in temperature is ordinarily noted in the latter parts of the catalyst traversed by the materials undergoing conversion. This diminishing of the temperature of the charge as it passes through the catalyst mass is probably caused to a large extent by the endothermic nature of the reaction, and it is often aggravated by the fact that relatively large catalyst masses must be employed to insure the proper contact time necessary for the hydrocarbon conversion. As the optimum temperature may not be maintained in a large portion of the catalyst chamber there is a decrease in conversion which not only may lower the yield to an economically unsatisfactory level but may produce a product of inferior quality. If it is attempted to maintain the average temperature of the reactants in the desired range throughout the catalyst by introduction at temperatures above the optimum level, the amount of superheating of the feed stock that is necessary will often cause undesirable thermal cracking in the preheater and in the lines to the catalyst chamber. Systems have been described for indirect heat exchange within the catalyst mass by means of radiators and the like carrying heat transfer fluids, but the complexity of such equipment and of its operation introduces tremendous engineering problems and greatly increased process costs.

The addition to the hydrocarbon charge of heat-stable gases and vapors which are substantially unconverted at reaction conditions has been proposed as a means of reducing endothermic heat losses within the catalyst bed. These diluent gases which may be premixed with the reactants or added thereto at or even above conversion temperatures then serve to maintain or restore conversion temperatures by both supplying sensible heat and by reducing the concentration of the reactants.

The present invention has for one object an improved and simplified process for the maintenance of conversion temperatures in a catalytic endothermic reaction of the type described.

A further object of this invention is a novel method for the provision of a relatively inert gaseous medium capable of serving as a heat carrier and diluent in endothermic hydrocarbon conversions.

A still further object of this invention is to provide a hydrocarbon conversion process promoted by a contact catalyst mass wherein the same gaseous medium is employed as a heat carrier in the conversion step and as a diluent and temperature control medium during reactivation of the catalyst. These and other objects and advantages of the invention will be obvious from the disclosure to follow.

I have now discovered that greatly improved results may be obtained in both the conversion and catalyst reactivation operations through the use therein of relatively inert combustion gases prepared in an auxiliary combustion chamber. These combustion gases generated under conditions which reduce the oxygen content of the combustion medium to desirable low values and which are available at any temperature up to the actual combustion chamber temperature are readily used as a diluent and heat carrier in the hydrocarbon conversion step. Likewise, said gases are highly satisfactory as a purge fluid and diluent for preparing low oxygen content reactivation gas for burning out carbonaceous deposits from the catalyst.

In the preferred embodiment, my process comprises the steps of (1) preheating the hydrocarbon charge with or without an inert diluent to the desired temperature and introducing it into the catalyst chamber; (2) simultaneously preparing a substantially oxygen-free gas by the combustion of fuel gas under moderate pressure in an atmosphere of an oxygen-containing gas; (3) introducing through suitably spaced points in the catalyst chamber the amount of hot combustion gas necessary to keep the temperature at the proper level; (4) utilizing sensible heat of the excess gas produced by step 2 to generate steam and power for the operation of the process; (5) carrying out the regeneration when required by cutting off the hydrocarbon charge and introducing in its place any suitable oxygen-containing gas.

The various operations outlined may be illustrated by the accompanying flow diagram which schematically shows a preferred arrangement of equipment for the practice of my invention. This diagram shows two catalyst chambers to illustrate a continuous operation wherein one chamber is on stream while the other is being regenerated.

In the drawing, a hydrocarbon charge stock enters through line 1 to preheater 2, after admixture with a substantially inert diluent from line 3 and valve 4. The charge mixture preheated substantially to conversion temperature then passes through line 5 to either of catalyst chambers 6 or 6A, depending on which chamber is in the processing period. The heated charge passes, for example, into the catalyst chamber 6 through valve 7 and line 8 and the catalyst effluent leaves the chamber through valve 10 and line 11 to fractionating and processing equipment not shown.

At the same time, a substantially oxygen-free combustion gas is generated in the combustion chamber 13 by combustion of an oxygen-containing stack gas entering through line 14 and charged through compressor 15 together with sufficient fuel gas from line 16 to consume substantially all the oxygen. The hot gasses from chamber 13 then pass partly to manifold line 17 and partly to boiler 18 wherein the gases are partially cooled with the generation of steam in vessel 19. The partially cooled gases are then taken through manifold line 20 and to the catalyst chamber supply lines 21 and 22. A portion of this gas may also be used as diluent for hydrocarbon feed ahead of the preheater by use of line 23 and valve 24.

The partially cooled combustion gas from manifold 20 is then blended with the hotter gas stream from manifold 17 to produce any desired temperature in the gas supplied to lines 21 and 22. This operation is performed by regulation of the supply valves 25 and 25A and the supply valves 26 and 26A to regulate the respective volumes of the gas streams entering lines 21 and 22. If desired, steam from vessel 19 may be added to manifold 17 through line 27 and valve 28.

The hydrocarbon charge passing through catalyst chamber 6 is mixed with additional amounts of the combustion gas from line 21 through valve 29 ahead of the catalyst chamber to supply additional heat and/or diluent. As the vapors undergoing conversion travel through the catalyst mass, further amounts of the hot combustion gas from line 21 are injected into the vessel 6 through a plurality of lines and valves 30 spaced along the vertical axis of the vessel 6. The amount of gas so added will depend partly on the temperature of the stream from line 21 and is regulated to restore and/or maintain conversion temperatures through the sensible heat of the added substantially inert material. For this service, the combustion gas may be provided at a temperature from about 50 to about 500° F. above that of the hydrocarbon charge stream.

Assuming that while the catalyst chamber 6 is on stream, the catalyst in chamber 6A is being regenerated, the following operations may be simultaneously performed to accomplish the regeneration. When the flow of hydrocarbons through 6A is stoopped by closing valve 7A, valve 10A is closed and valve 12A is opened, and the substantially inert combustion gas from line 22 to pass through the catalyst bed from line 22 through valve 29A and line 9 and/or through valves 30A. The temperature of the gas used in this purging operation may be adjusted to bring the catalyst bed to any desired level prior to regeneration by proper regulation of valves 25A and 26A. When hydrocarbons have been purged from the catalyst mass, an oxygen-containing gas is admitted through valve 32A from line 31. This oxygen-containing gas may be air from line 33 or stack gas from line 34, and the mixture of the gas streams from line 31 and line 22 is regulated by means of valve 32A to produce a suitable oxygen concentration in the regeneration gas passing through the catalyst. This regulation of the oxygen content is necessary to prevent excessive temperatures within the catalyst bed during the regenerative combustion, and the oxygen concentrations employed are ordinarily selected according to more or less conventional procedures for this operation. During regeneration the effluent gases from chamber 6A are vented through valve 12A, and when the regeneration is complete, oxygen is purged from the chamber by closing valve 32A and continuing the passage of substantially inert gas from line 22 and valve 29A. During this purging operation, the reactivated catalyst may be brought to conversion temperature if desired by adjusting valves 25A and 26A to produce the corresponding temperature in the gas stream flowing through line 22.

When it is desired to put chamber 6A on stream and regenerate chamber 6, the change requires only closing valves 7 and 10 and 12A and opening valves 7A, 10A, and 12. Regeneration in chamber 6 then proceeds as noted above.

The oxygen-containing gas supplied to the combustion chamber may be stack gas obtained by cooling the combustion products from the heater or furnace employed in the catalytic process or from any convenient source. Alternately, air may be used in the combustion chamber as is indicated in the drawing by line 35. The steam produced in the boiler may be used for power for the process, e. g., for running compressor 15 (through line 36). This steam is also a satisfactory diluent for the hydrocarbon charge and may be added ahead of the preheater through line 37 and valve 38. Any steam required for these or other steps in the process may, of course, be supplied from an external source not shown.

The nature of the hydrocarbon charge and the conversion performed will determine to a large extent the relative volumes of diluent and/or temperature control medium to be added at the various points illustrated in the flow diagram. Thus, in the catalytic cracking of relatively heavy hydrocarbon oils such as gas oil, reduced crudes, and the like, it is often highly desirable to introduce relatively large volumes of diluent ahead of the preheater. This diluent may be the same as the heat control medium or if desired other heat stable materials such as normally gaseous hydrocarbons, steam, and the like, may be admixed with the cracking stock. A preferred method of operation on a gas oil stock is illustrated by the introduction of combustion gas and/or steam ahead of the preheater to decrease the viscosity of the charge and reduce coking and thermal cracking in the preheater. Of course, when lighter, more refractory stocks such as gasoline or lighter hydrocarbons are being treated to effect reforming, dehydrogenation, cyclization, and the like, these considerations will be of less importance.

After the hydrocarbon charge with or without diluent leaves the preheater, the volume of temperature control medium and/or diluent added ahead of the catalyst case will depend on the total volume of diluent desired in the catalyst zone and on the portion already added ahead of the preheater and to be added directly to the catalyst chamber. It is often desirable to add a considerable proportion of diluent ahead of the preheater, and then to add sufficient of the high temperature combustion gas just ahead of the catalyst chamber to balance transfer line heat losses and attain the conversion temperature.

Since the combustion gas is available at any temperature up to the actual combustion chamber temperatures, an alternative method and one which may be desirable in some installations is to operate the preheater at a lower temperature level and attain conversion temperature by admixture of large volumes of high temperature diluent just ahead of the catalyst. In such an instance, a mixing chamber may be provided to give intimate mixing of the hydrocarbons and the hot gases, or the top section of the catalyst chamber itself may be left empty and adapted to this service.

After the hydrocarbon charge enters the catalyst bed, the magnitude of the temperature drop accompanying conversion will depend on the nature of the charge and the extent and nature of conversion. In cracking heavy oils to produce gasoline, even with considerable dilution of the hydrocarbons, conversion may be limited by temperature gradients through the catalyst of 100° F. or even more. This heat loss may be calculated and/or experimentally determined, and sufficient injection points for the hot combustion gases provided to allow temperature control within satisfactory limits. The volume of heat control medium added at each level in the catalyst chamber and the number of injection points may be selected in conformance with the requirements of individual installations. In most cases, maintenance of the temperatures within the catalyst zone within a relatively narrow range is satisfactory, and this range may be only a minor proportion of the temperature gradient existing without the use of the temperature control medium. Thus, by the present invention, conversion temperatures may vary only about 10 to 30° F. whereas under adiabatic operation the gradient may be from 50 to 100° F. or more.

The catalyst chamber may be arranged as shown, in which case the catalyst is used in the form of a long bed, and the combustion gases utilized to maintain the temperature are introduced through inlets arranged at spaced points along the case. Or preferably, the catalyst may be arranged as sections on spaced trays or supports in the chamber and the hot combustion gas introduced into the reaction chamber at free spaces between the trays.

It is apparent that many changes can be made in the arrangement of the apparatus without departing from the scope of the present invention. For example, heat exchangers may be advantageously employed at many places, the combustion chamber and steam boiler may be combined in one unit, and the number of catalyst chambers as well as the number of inlets to each chamber is not limited to any specific number, but is only fixed by the economics of the conversion for which it is employed. Also, the spacing between the inlets arranged alongside the catalyst case does not necessarily have to be equidistant. A possible arrangement which allows approximately equal contact time of hydrocarbon with catalyst consists of placing the inlets at gradually increasing intervals in the direction of the gas flow. This allows a greater depth of catalyst as the charge is diluted.

The catalyst to be employed in the reaction chamber will depend on the reaction desired. For gas oil cracking and reforming, processes for which this invention is particularly applicable, natural oxides or activated clays with or without minor amounts of metal oxides or other promoters may be used as catalysts. Some examples are silica-alumina and bauxite catalysts. Any well-known dehydrogenation catalyst may be used for the dehydrogenation reactions. Metal oxides as alumina, chromic oxide, zirconium oxide, molybdenum oxide, etc. either alone or in various combinations may be used for dehydrogenation.

The temperatures employed in the process depend on the type of reaction and on the type of charge. In general, cracking processes require temperature ranges from 700 to 1100° F. In the cracking of gas oil and the like the operating temperature may range from 850 to 1050° F. In dehydrogenation the temperature of the process is also a function of the boiling point range of the feed. Dehydrogenation of light hydrocarbons as $C_4$ and $C_5$ will require temperatures as high as 1200° F. while corresponding lower temperatures are used for the dehydrogenation and reforming of higher boiling hydrocarbons. The range of temperatures is usually 900 to 1200° F. Suitable reactivation temperatures are 800° to 1100° F. The maximum temperature, while reactivating the catalysts employed, should not ordinarily exceed about 1300 to 1500° F.

Atmospheric pressure or superatmospheric pressures up to 1000 lbs./sq. in. are suitable for the hydrocarbon conversion processes, the preferred range being from about 15 to about 150 pounds gage. The pressure at which the combustion chamber is operated depends on the hydrocarbon conversion pressure, and it may be operated at a sufficient pressure to maintain flow of the combustion atmosphere without further compression. Alternately, the combustion gases may be compressed to pressures required for the described uses.

In operation of the combustion chamber a constant volume of stack gas is ordinarily supplied to the chamber. The amount of fuel introduced is adjusted to the oxygen content of the oxygen-containing gas, and the gas leaving the chamber is considered substantially oxygen-free when it contains about 0.2 per cent or less of oxygen. With stack gases containing up to about 10 volume per cent of oxygen, the combustion temperature in chamber 13 may range from 2000 to 2500° F. depending on the heat value of the fuel gas, while the use of air as the oxygen-containing gas may produce combustion temperatures in the range of 3000 to 3500° F. Thus, whereas air can be used and it has the advantage of usually being readily obtainable at any desired pressure, it is ordinarily preferred to use gases containing less than about 10 per cent oxygen because of the reduced severity of the service of the combustion chamber shell, refractory linings, gas lines, etc., that is associated with the lower temperatures. The employment of the higher temperatures not only usually means a higher construction and maintenance cost, but it also may not be conducive to the complete combustion of the fuel to carbon dioxide.

The process described in this invention has its great advantage in the simplicity and ease with which it attains one of its main objects; namely, the achievement and maintenance of the desired temperature within a narrow range in a catalytic endothermic reaction. The basic controls necessary for this process are simply reduced first, to the proportioning of a hot substantially oxygen-free gas stream with a cooler one to produce an inert diluent of any desired temperature, and secondly, to the proportioning of the above inert gas stream with the hydrocarbon feed stream to produce the desired hydrocarbon concentration and conversion temperature necessary for the reaction throughout the catalyst bed. These steps are exemplified in the illustration first, by the proportioning of the two substantially inert gas streams at the different temperature levels, and secondly, by the proportioning of the substantially inert diluent and/or heat carrier thus obtained with the hydrocarbon charge. Operating controls such as proportioning flow controllers actuated by the temperature of the gas stream at the proportioning points may be employed if desired.

The presence of carbon dioxide and steam in the reaction mixture is also advantageous. These substances have a tendency to react with carbon at the temperature employed and thus are able to prolong the activity of the catalyst by retarding the carbon deposition. Similarly, in the regeneration step, this function of the steam and carbon dioxide is advantageous.

The availability of a substantially oxygen-free gas and the method by which it is supplied to the conversion step are of great importance in the regeneration step. As previously pointed out, the process supplies an inert medium readily available, first, for the purging of the system during the transition from the conversion to the regeneration period or vice versa, and secondly, for the dilution of the oxygen-containing gas which is necessary in order to avoid regeneraiton temperatures harmful to the catalyst. Another benefit is the ease with which the necessary temperature changes from the conversion to the regeneration period and back again can be made. These temperature adjustments simply require proportioning the two inert gas streams in such a manner so that the desired temperature is obtained.

While the foregoing discussion has been relatively specific to the preparation and use of a substantially oxygen-free gas for use in both the conversion and regeneration periods, it will be obvious that the process may be extended to the use of very small concentrations of oxygen in the gas from the combustion chamber. When necessary controls and gas mixing devices are employed, small concentrations of oxygen in the gaseous medium injected into the hydrocarbon stream while passing into and/or through the catalyst bed will serve both to furnish heat by limited oxidation and to reduce hydrogen and/or coke concentrations within the catalyst space. In such an embodiment, the addition of these small concentrations of oxygen is confined by suitable arrangements to the conversion period and to the catalyst zone itself, while diluents employed further up-stream are ordinarily substantially oxygen-free.

In the production of the inert combustion gas, much excess energy is often obtained. This excess energy can be made available in any desirable manner for use in the process. The preferred method of using this excess energy as outlined in this disclosure is for the production of steam which in turn can be used as a diluent in the reaction or as a partial source of power for the running of compressors, blowers, etc.

The following example illustrates one specific application of the process of this invention to the catalytic cracking operation.

*Example*

A catalytic gas-oil cracking operation on a charge having a specific gravity of 33° API and a boiling range of 425 to 700° F. was conducted in apparatus corresponding to that illustrated in the drawing. The catalyst chamber consisted of a tube of approximately five inches in diameter and five feet long and contained five gallons of catalyst. Four inlet tubes were arranged along the side of the catalyst chamber. Gas oil diluted with 10 per cent by weight of combustion gas was preheated to a temperature of 975° F. and passed in vapor phase into the catalyst chamber at the rate of 1.0 liquid volume of gas oil per volume bauxite per hour. The temperature of the gas generated in the combustion chamber by the combustion of fuel gas in stack gas containing about 10 per cent oxygen was 2400° F. and a portion of this gas was mixed with the stream of partially cooled gas issuing from the boiler at 600° F. in such proportions as to produce a substantially oxygen-free gas at a temperature of 1300° F. With the hydrocarbon charge entering the catalyst zone at 975° F. the conversion in the first section of the catalyst bed was sufficient to cause a drop of about 26° F. under adiabatic conditions. Approximately 19 pounds of diluent at 1300° F. were added through the first inlet tube for every 100 pounds of charge mixture in order to keep the temperature at around 975° F. Similarly about 19 pounds of diluent was added through each of the other three inlet tubes for every 100 pounds of original charge. Thus approximately 86 pounds of diluent were used for every 90 pounds of hydrocarbon charge and the temperature was kept in the range of 950 to 975° F. The pressure throughout the 8 hour period was kept at 75 lbs./sq. in. The per pass conversion averaged 46 volume per cent of the gas-oil charged and the gasoline yield was over 95 per cent of the gas oil converted. The stabilized gasoline from this operation, substantially free of $C_4$ hydrocarbons and having an end-point of 398° F. had an ASTM octane rating of 80. The carbon deposited on the catalyst was about 0.2 per cent by weight of gas oil charged during the cracking period of 8 hours.

The regeneration was brought about by purging the chamber with substantially oxygen-free combustion gas at 800° F. When the purging was complete, about 25 per cent by volume of air was passed into the combustion gas stream making a regenerating gas mixture containing about 5 per cent oxygen. The flow rate of this regenerating gas mixture was adjusted so that the maximum temperature within the catalyst bed did not exceed about 1300° F. The time of regeneration was 4 hours under these conditions.

An experiment was carried out as above in which 10 per cent by weight of combustion gas and 90 per cent of gas oil was mixed and preheated to 975° F. The charge was then passed at substantially this temperature through the catalyst chamber at a flow rate of one liquid volume of oil per hour per volume of catalyst with no other additions of diluent and/or heat carriers being made. The outlet temperature was 885° F. and only a 25 per cent per pass conversion of the gas oil was obtained, although reaction time was considerably prolonged. The conversion period under these conditions was only 4 hours.

Since the above-described apparatus served to illustrate a single possible arrangement of equipment for the practice of my invention and since the foregoing example served to illustrate one specific application of the process, no limitations are implied thereby. Numerous modifications will be obvious within the scope of the disclosure, and hence are a part of the invention as defined by the following claims.

I claim:

1. A cyclic process for the endothermic catalytic conversion of hydrocarbons by contact of said hydrocarbons with a mass of contact catalyst in the catalyst zone, in which each cycle includes successively the steps of conversion, purging of hydrocarbons from spent catalyst, reactivation of catalyst by combustion with an oxygen-containing gas, and purging of residual oxygen from reactivated catalyst; which comprises preparing a substantially oxygen-free diluent from a flue gas made essentially oxygen-free by further combustion with a fuel gas, splitting the resultant products of combustion into two streams, one of which is at a temperature above the desired conversion temperature, cooling the other stream to a temperature below the desired conversion temperature, admixing at least a portion of the cooled stream of diluent with hydrocarbon charge stock and preheating said mixture to conversion temperatures, flowing said preheated mixture through said catalyst zone under conversion conditions while controlling the endothermal loss accompanying the conversion by injecting into the hydrocarbon-containing stream at a plurality of points within the catalyst zone spaced in the direction of flow a sufficient quantity of the higher temperature stream of diluent to compensate for said heat loss, recovering the products of conversion, purging residual hydrocarbons from the spent catalyst mass preparatory to reactivation by discontinuing the flow of hydrocarbon charge while continuing the flow of said inert oxygen-free diluent at a temperature not exceeding said cracking temperature for a period of time sufficient to substantially remove said residual hydrocarbons, the temperature of said purging gas having been adjusted by blending of the high and low temperature inert gas streams; then adding to said inert oxygen-free diluent flowing through said catalyst mass sufficient oxygen-containing gas to produce a satisfactory reactivation medium for the removal of carbonaceous deposits by oxidation, continuing the flow of said reactivation medium at regeneration temperatures for a period of time sufficient to effect substantial removal of carbonaceous deposits from said catalyst, and then purging residual oxygen from the catalyst mass by discontinuing the introduction of oxygen into said inert diluent gas while adjusting the temperature of said reactivation medium by suitable blending of said high and low temperature inert gas streams, and continuing the flow thereof for a period of time sufficient to effect said purging.

2. A process according to claim 1 in which the hydrocarbon conversion is the catalytic cracking of heavy gas oils, and in which that portion of the oxygen-free products of combustion which is cooled is so cooled during the generation of steam, and the steam so generated is introduced along with said hydrocarbon charge as an additional diluent therefor during the conversion.

WALTER A. SCHULZE.

REFERENCES CITED

The following references are of record in the file of this patent:

UNITED STATES PATENTS

| Number | Name | Date |
|---|---|---|
| 1,907,029 | Andrews et al. | May 2, 1933 |
| 1,991,750 | Keeling | Feb. 19, 1935 |
| 1,996,243 | Heid | Apr. 2, 1935 |
| 2,231,231 | Subkow | Feb. 11, 1941 |
| 2,251,571 | Howard | Aug. 5, 1941 |
| 2,259,485 | Plummer | Oct. 21, 1941 |
| 2,261,151 | Fast | Nov. 4, 1941 |
| 2,285,401 | Bates | June 9, 1942 |
| 2,290,580 | Degnen et al. | July 21, 1942 |
| 2,312,006 | Thiele | Feb. 23, 1943 |
| 2,320,284 | Krebs et al. | May 25, 1943 |
| 2,346,750 | Guyer | Apr. 18, 1944 |

FOREIGN PATENTS

| Number | Country | Date |
|---|---|---|
| 750,496 | France | May 29, 1933 |
| 763,942 | France | Feb. 26, 1934 |